United States Patent

Butler et al.

[11] Patent Number: 5,937,577
[45] Date of Patent: Aug. 17, 1999

[54] PLANT RING FOR USE IN NURSERIES

[76] Inventors: Jason Trent Butler; Joel Freeman Butler, both of 411 Palmola St., Lakeland, Fla. 33803

[21] Appl. No.: 08/781,419

[22] Filed: Nov. 27, 1996

[51] Int. Cl.[6] ........................... A01G 23/02; A01G 23/04; A01G 9/02
[52] U.S. Cl. ........................................ 47/73; 47/76; 47/78
[58] Field of Search .................................... 47/73, 76, 78, 47/83, 66.3, 30, 26; 139/420

[56] References Cited

U.S. PATENT DOCUMENTS

| | | | |
|---|---|---|---|
| 2,793,470 | 5/1957 | Hallum | 47/73 |
| 2,960,798 | 11/1960 | Lindsteadt | 47/73 |
| 3,681,872 | 8/1972 | Leitch | 47/1 |
| 3,709,263 | 1/1973 | Jackson et al. | 139/420 |
| 4,065,876 | 1/1978 | Moffet, Jr. | 47/83 |
| 5,544,447 | 8/1996 | Easey et al. | 47/66 |

FOREIGN PATENT DOCUMENTS

| | | | |
|---|---|---|---|
| 1597853 | 8/1970 | France | 47/76 WB |
| 145483 | 8/1902 | Germany | 47/76 |
| 2814679 | 10/1979 | Germany | 47/78 |
| 406038640 | 2/1994 | Japan | 47/78 F |
| 366735 | 4/1970 | United Kingdom | 47/76 |

OTHER PUBLICATIONS

American Nurseryman. "Wooster Tube", 5 pages, Jan. 1980.

Primary Examiner—Michael J. Carone
Assistant Examiner—Fredrick T. French, III
Attorney, Agent, or Firm—Tom Hamill, Jr.

[57] ABSTRACT

A cylindrical plant container having a dual sidewall is provided. The inner sidewall is constructed of polypropylene fabric and the outer sidewall is constructed of wire, such as chicken wire. The inner sidewall extends above the outer sidewall and is folded over the top of the outer sidewall and is fastened thereto. The inner sidewall also extends below the outer sidewall and is folded over the bottom of the outer sidewall and is fastened thereto. The present invention is designed to be used in a plant nursery. The woven polypropylene permits air to penetrate through the sidewall permitting air pruning of the roots proximal the sidewall. This forces the roots to grow in both a horizontal and downward fashion resulting in a denser plant root system with no spiraling or circling of roots within the cylindrical plant container. The heat transfer characteristics of the polypropylene reduces the root ball temperature compared to other containers.

2 Claims, 2 Drawing Sheets

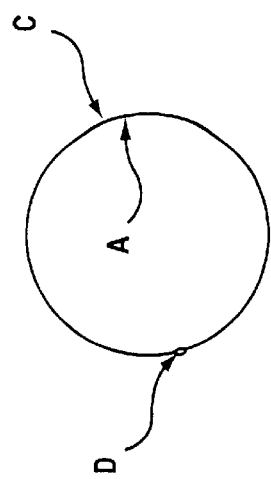
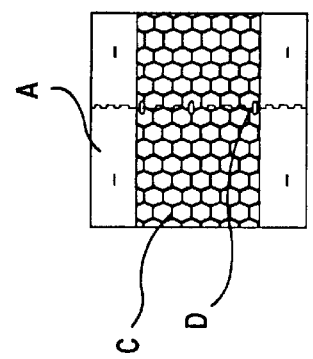
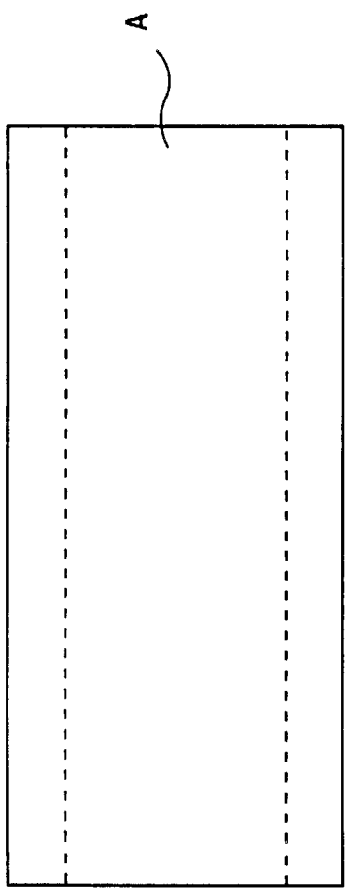
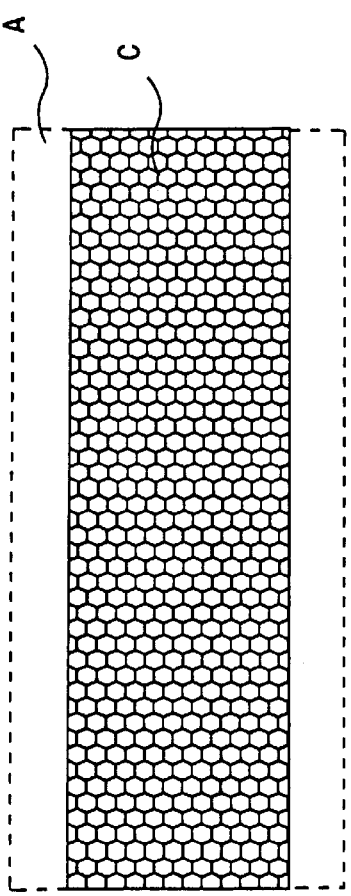
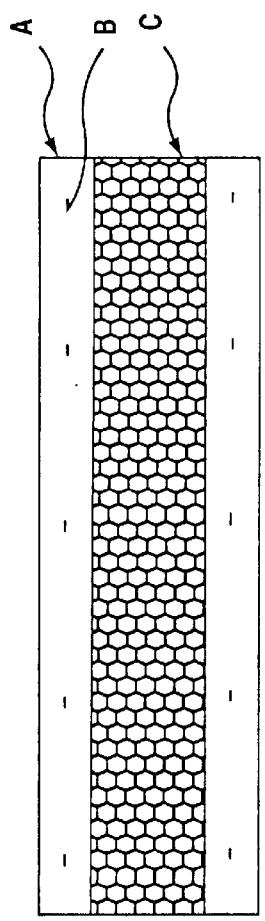

PLANT RING FOR USE IN NURSERIES

BACKGROUND OF THE INVENTION

1.) Field of the Invention

The present invention is a new, reusable growing container that reduces unfavorably high temperatures within a plant's root ball and produces a beneficially modified root system by a technique called "air-root pruning." Both of these factors in turn produce a superior quality plant and alleviate trauma during transplanting of nursery grown trees and plants.

2.) Description of the Prior Art

Since the mid-twentieth century, commercially grown plants have been cultivated in some type of container that provides ease of management and transportation. The container grown plant was immediately recognized as being beneficial over the traditional field grown plant, because the root systems were neither cut nor damaged when transported to a landscaping site. Over the years, nursery owners have developed ways of improving plant production with examples like new types of fertile media to environmentally safe pesticides and herbicides. Possibly, the most important fact recently discovered was that reducing the girdling of roots, created by solid plastic containers, increases not only a plant's growth and health but also its aesthetic quality.

In the past few decades, the popularity of the plastic container has grown rapidly and is now used consistently among nursery owners. Though popular, several drawbacks have been noted and supported by many research institutions.

First, these plastic containers conduct heat that can intensify root ball temperatures to unfavorable conditions, especially in nurseries located in warmer climates. This fact causes increased evapotranspiration and in turn creates a favorable environment for plant wilt. To combat this problem, nurseries have to increase watering times and water usage which is undesirable in this decade of needed water conservation.

Secondly, root systems are allowed to become circular within the plastic container producing a girdling effect, consequently reducing the effectiveness of growth before and after transplanting. Stunted growth and slow adaptation at a newly planted landscape site are recognizable results of an unmanaged root system.

Among these noted disadvantages exist positive concepts about the plastic container that should not be overlooked when developing new types of growing containers. One economical benefit offered by the plastic container is its ability for re-use in the nursery. A nursery owner can also appreciate its shape which allows for convenient storage and space conservation.

Lately, several different types of manipulated plastic containers have surfaced commercially demonstrating the air-root pruning technique that aids in the prevention of spiraling and circular root patterns. Air-root pruning is a method by which root tips are burnt when exposed to air. This causes the root to discontinue growth and branch outward into several new root tips. The branching effect is very beneficial because it is these laterally spreading root tips that provide the plant with the most uptake of water and nutrients necessary for survival. In solid containers, roots have no release possibilities essentially causing a plant's root system, after a substantial growth period, to "choke" and hinder its longevity of life.

Patented containers such as U.S. Pat. No. 4,442,628, issued Apr. 17, 1984, used notched sections within the container's sidewall to trap root tips causing them to die off and produce root branching. This procedure was not fully successful and led to a predecessor that was U.S. Pat. No. 4,497,132, issued Feb. 5, 1985. This second root pruning container also did not produce great results because spiraling roots still occurred, but lateral root branching was numerous. So, a third root pruning container in this line, U.S. Pat. No. 4,753,037, issued Jun. 28, 1988, was designed with not only root trapping compartments but also intricate cuts in the sidewall of the container to allow for the air-root pruning method to work. This third container was fairly successful but resulted in high manufacturing costs and thus became uneconomical for nursery owners.

The U.S. Pat. No. 5,241,784 issued Sep. 7, 1993, refers to an aluminum grow ring that was recently introduced into the horticulture market. This new air-root pruning grow ring has been successful in stopping the girdling effect caused by solid plastic containers, but the use of aluminum material as a sidewall has two major drawbacks.

First, the aluminum aids in the increasing of root temperatures which is not desired by growers. A favorable nursery conditions for maximum foliage growth of many plants is to allow for ample spacing between the plants. When spaced out properly, a container is then subject to the sun's rays and the chance of increased root ball temperatures. The direct sunlight's heat is not reflected, but absorbed by the aluminum container increasing root ball temperature to unfavorable conditions for maximum growth.

Secondly, the high production cost of the completed aluminum ring is not only a burden financially, but it also pressures the nursery owner into removing the ring before shipping for reuse. This leaves container grown plants to be transported without any support around the root ball. When root balls are not supported by a container the consequences could be fatal if plants are mishandled or not planted within a reasonable amount of time once on the landscape site.

The present invention provides a solution for all the previously mentioned reoccurring problems. The use of polypropylene fabric allows root balls to not only "breathe" in order to fight high temperatures, but also has proven very successful in utilizing the air-root pruning technique. The absolute stopping of root girdling and the increase in lateral root growth allows the said trees and plants to adapt very well at landscape sites.

With it being very economical to produce, at under half the cost of the aluminum grow ring, the present invention allows nurseries to transport plants with the container supporting the root ball. This factor also adds to the success rate of said trees or plants at landscape sites. Therefore, the present invention represents a new generation design of temperature controlling, air-root pruning containers.

SUMMARY OF THE INVENTION

The present invention is a cylindrical container comprised of a polypropylene fabric supported by means of honeycomb "chicken" wire. The cylinder is open at the top and bottom and may be placed on the ground or upon a chosen material determined and preferred by the user.

It is an object of the invention to provide a new, superior growing container which will decrease temperatures within the root ball of nursery grown plants found in warmer climates, therefore, aiding in nursery water management and allowing for improved growth and overall aesthetic appearance.

A further object of the present invention, while accomplishing the above objective, is to provide a modified, beneficial root pruned plant by means of a technique known as "air-root pruning". This technique not only produces a more beautiful, healthy plant in the nursery, but also reduces the chance of shock, girdling, and death during and after transplanting into a landscape site.

These main objectives will be clarified by given details (and other factors) revealed later on in this reading and supported by accompanying drawings and photographs.

DESCRIPTION OF THE DRAWINGS

FIG. 1 is a view of the polypropylene fabric, with perforated lines showing prospective placement of "honeycomb" chicken wire.

FIG. 2 is a view showing the "honeycomb" chicken wire centered on top of the polypropylene fabric (now designated by the perforated lines) of FIG. 1.

FIG. 3 is a view showing the polypropylene fabric folded over and stapled to the "honeycomb" chicken wire of FIGS. 1 and 2, allowing the top and bottom edges of the two individual sidewalls to now act as one sidewall, as is with the side edges.

FIG. 4 is a top or bottom plan view of the completed present invention after each side edge was clasped together. Both the top and bottom are identical.

FIG. 5 is a side view of the present invention after being completed and demonstrates that it is cylindrical and stands vertically.

DETAILED DESCRIPTION OF THE INVENTION

Figure 6:
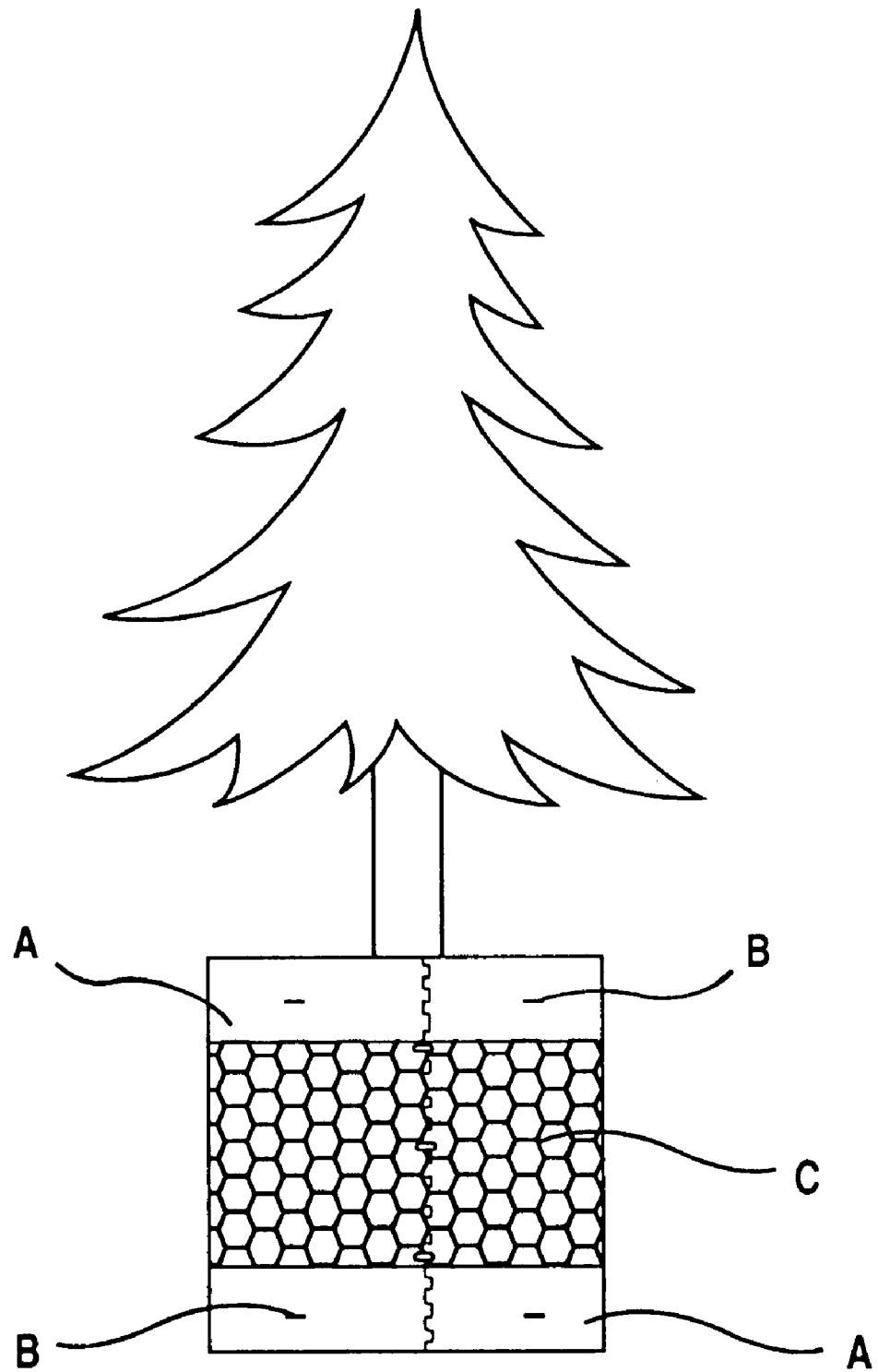
FIG. 6 is a perspective view showing a plant and its associated growing media residing within the plant container.

The present invention is a new growing container defined as an above ground airroot pruning ring meant for use in plant nurseries located in all types of suitable growing climates. A tightly woven polypropylene fabric A, ordinarily utilized as a weed barrier in nurseries, is used as the sidewall of the present invention, while "chicken" net wire C, with its honeycomb design, is the source of support for the polypropylene fabric, potting soil, and the plant. This specific type of wire was chosen because of its excellent support) the elimination of a "sleeve" which is necessary when using grow-bags, and its ease of assembly. The combination of these two relatively well known, inexpensive products, has constructed a totally different product than the two could do singularly and has created important benefits.

The first benefit of the present invention is the ability of the woven polypropylene fabric sidewall to allow a breathing (cooling) action to occur within the ring. This is due to the low mass of the fabric, thus the transfer of heat into the root ball and/or adjacent potting soil is less than that of a solid plastic or aluminum container.

The standard plastic or aluminum containers used in nurseries of warmer climates can cause high temperatures in root zones which is truly undesirable. Many growers will place plants in close proximity of each other to shade the plastic or aluminum container sidewalls. This may reduce soil temperatures within the container, but at the same time this spacing method will hinder a plant's canopy ability to spread producing a less desirable physical appearance. The present invention solves this problem by allowing the grower to increase space between plants while not having to worry about intolerable root temperatures.

Research has proven that a plant with a cooler root zone shows overall improved growth. One significant element effected by high temperatures in root balls is the production of callus tissue. Callus tissues are new cells responding to wounded plant material, in this case found in the root system, leading to the production of new adventitious roots. It should be noted that the new adventitious roots and callus are delicate and easily damaged. It is understood that callus production is retarded at 90 degrees F. and higher, and that cell injury becomes more evident as the temperature continues to rise. Depending on certain types of plants, death of cells can begin to occur at 104 degrees F. and this rate increases rapidly as the temperatures rise (Hartmann, Kester, and Davies, Jr. pp. 9 & 320). Therefore, it is extremely important to keep root ball temperatures at optimal levels for maximum plant production. This is accomplished by the present invention and not by other air-root pruning containers.

A second important benefit of the present invention is its superior air-root pruning ability over many of the other patented containers. Other containers use slits in the sidewalls that are placed an inch apart and are not providing the full potential for air-root pruning. The present invention's use of polypropylene fabric means that root tips can penetrate outward towards air at many more points due to the increased density of openings provided within the sidewall. This tremendously increases the surface area at which air-root pruning can take place. Root distribution is also effected in a positive manner when the air-root pruning technique is applied. Roots, after producing excessive lateral branching due to air-root pruning, become evenly distributed throughout the container creating a highly dense root system. The denser root system provides the plant with greater water and nutrient uptake, and a higher survival rate due to reduced shock when transplanted into a landscape site.

Extra water and nutrient uptake by a plant's root system requires less watering and fertilizing by the nursery. This helps to curb a nursery's overhead costs, thus reducing plant prices and increasing sales volumes. Water management and improved root ball drainage are yet other examples of beneficial tactics that the present invention provides. Having smaller amounts of water standing in a container means reduced chance of root rots and other diseases occurring.

A third major advantage of the present invention is the absence of a bottom wall allowing a nursery owner to set the container in the field on any preferred surface, i.e.: bare ground, woven ground covers, porous cloth fibers, plastic ground covers, or any material of the like. With the plant's ability to disperse roots into the ground, because of a porous material or no bottom on the ring, more stability is created. This eliminates plants from blowing over in gusts of wind, something other containers can not compensate for, decreasing the labor extensive hours of setting plants back up to their vertical positions.

The fourth significant benefit of the present invention is the price reduction that can be obtained, creating a more economical approach to container production in the horticulture industry. With a decrease in mass and material over standard containers, manufacturing cost of the ring is approximately 53% less than that of the previously mentioned aluminum grow ring. Also, the ratio of plastic and metal is much less than that of other containers making the present invention more environmentally friendly.

The present invention is normally assembled in a seven gallon size (FIGS. 1–5), but can be made in sizes up to twenty-five gallons without the ring losing any sturdiness. Any sizes above twenty-five gallons requires the "honeycomb" chicken wire be replaced with a heavier gauged wire with square or rectangular style mesh.

For the purpose of this patent a seven gallon ring will be set as the standard for measurements, etc., and measurements of the other ring sizes will not be cited, herein. The remaining rings' heights, widths, lengths, and diameters can be figured by using simple mathematical formulas. The measurements of the seven gallon ring are twelve inches in height (FIGS. 3 & 5), one eighth of an inch in width (FIG. 4), forty-four inches in length (FIG. 3), and has a diameter of thirteen inches in completed form (FIG. 4). The detailed manufacturing process of the present invention is clarified below.

A six feet by three hundred feet roll of the polypropylene fabric is cut into one and a half foot wide sections (allowing for overlap) and then cut into forty-four inch lengths, whereby three hundred and twenty-seven polypropylene fabric sides are produced from the single roll (FIG. 1). Next, a one foot by one hundred fifty feet roll of "honeycomb" chicken wire is cut into forty-four inch lengths, whereby forty "honeycomb" chicken wire sides are produced per roll (FIG. 2).

The polypropylene fabric sidewall is laid flat with the "honeycomb" chicken wire centered on top. The extra three inches of polypropylene fabric found at the top and bottom edges is then folded over and stapled with one-forth inch galvanized metal staples B to the "honeycomb" chicken wire, all the way across at intervals of eight inches using a total of ten staples per ring (FIG. 3). Once the combined sidewall is produced, both side edges are connected together creating a circle, hence called a ring, with a total of five C-Ring fasteners D, each eleven sixteenth inch in size per completed ring. A fastener is clasped on both the top and bottom edge where the polypropylene fabric of one side edge slightly overlaps the second adjoining polypropylene fabric side edge. Three C-Ring fasteners are also clasped in the middle of the side edges at equidistant joining adjacent "honeycomb" sections together (FIG. 5).

After being manufactured, the present invention is conveniently stack in groups of tens, twenties, or thirties for easy shipment and storage. With all the benefits stated above, the present invention shall prove to have a positive effect on the horticulture industry. Cooler root temperatures, no root girdling, price reductions, and less materials all play key roles in producing a favorable, marketable, environmentally friendly product that will aid nursery owners in producing quality plants.

What is claimed is:

1. A container for supporting and storing live plants above ground, said container including, an outer sidewall, said outer sidewall comprised of wire mesh, said outer sidewall having a top edge, a bottom edge, a right edge and a left edge, an inner sidewall, said inner sidewall constructed of a woven material, said woven material having a top edge, a bottom edge, a right edge and a left edge, said outer sidewall right edge being connected to said outer sidewall left edge, and said inner sidewall right edge being connected to said inner sidewall left edge, forming a generally cylindrical container, said inner sidewall top edge is folded over said outer sidewall top edge, and is secured thereto, said inner sidewall bottom edge is folded over said outer sidewall bottom edge, and is secured thereto, whereby said inner sidewall will reside proximal the growing medium in which the plant resides and said outer sidewall will provide support permitting said container to stand in a vertical fashion, said woven material permitting air to penetrate through said cylindrical container.

2. A container for growing plants as claimed in claim 1 wherein said woven material comprises polypropylene.

* * * * *